No. 709,969. Patented Sept. 30, 1902.
E. DENEGRE.
SPRING CUSHION.
(Application filed May 22, 1902.)
(No Model.)
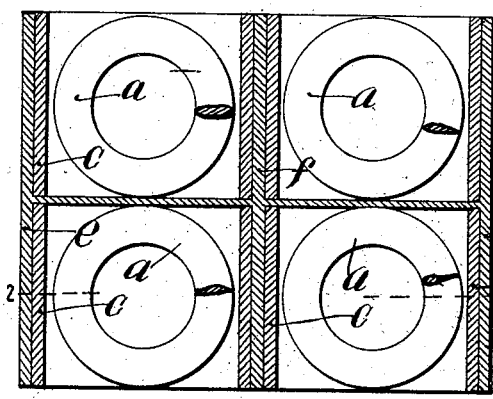
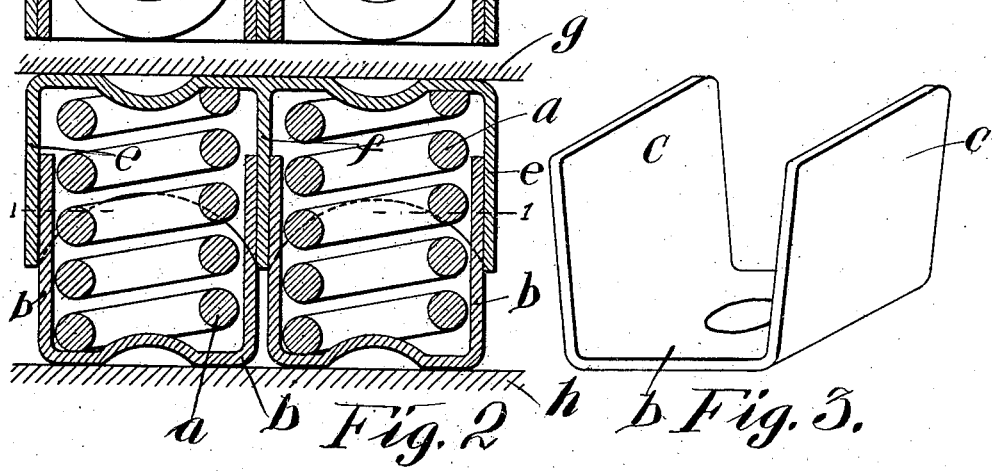
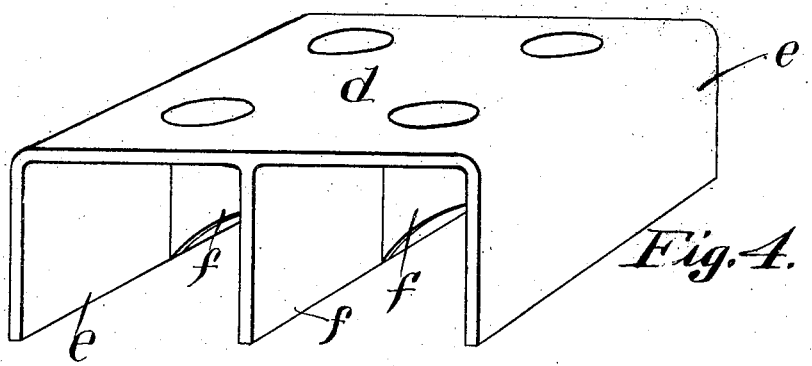
Witnesses:
Lynn A. Williams
Harvey L. Hanson
Inventor:
Edward Denegre.
By Charles A. Brown & Cragg
Attorneys.

UNITED STATES PATENT OFFICE.

EDWARD DENEGRE, OF CHICAGO, ILLINOIS, ASSIGNOR TO McCORD & COMPANY, OF CHICAGO, ILLINOIS, A CORPORATION OF NEW JERSEY.

SPRING-CUSHION.

SPECIFICATION forming part of Letters Patent No. 709,969, dated September 30, 1902.

Application filed May 22, 1902. Serial No. 108,551. (No model.)

*To all whom it may concern:*

Be it known that I, EDWARD DENEGRE, a citizen of the United States, residing at Chicago, in the county of Cook and State of Illinois, have invented a certain new and useful Improvement in Spring-Cushions, (Case No. 2,) of which the following is a full, clear, concise, and exact description, reference being had to the accompanying drawings, forming a part of this specification.

My invention relates to spring-cushions employing coiled springs in combination with retarders or dampeners made of spring metal, whereby friction may be secured to reduce the vibration of the coiled springs by the resiliency of the said spring metal.

One object of the invention is to provide a structure wherein a cap-plate formed of resilient spring metal may be employed and means whereby the operation of such cap-plate may be positively limited, which result may be secured by providing a rigid friction element in association with the flexible cap-plate, whereby a great advantage is secured over spring-cushions wherein both cap-plates are made of resilient spring metal, neither of which furnishes an abutment or positive limitation for the operation of the other. Such devices of the prior art have not met with the satisfaction desired, owing to the fact that they have not given the requisite degree of flexibility in operation and the required sufficiency of friction, especially where a cluster or group of four springs is employed arranged in a quadrilateral.

My invention has for its further object the provision of a structure wherein effective operation can be secured with any arrangement of the springs, to which end each spring is provided with a complete friction-producing element in addition thereto, which element is preferably in the form of a cap-plate composed of resilient spring metal. The springs of a cluster are provided with rigid cap-plates in addition to the flexible cap-plates, the rigid cap-plates being preferably compositely formed in one integral structure, such a structure in effect affording a plurality of pockets corresponding to the recesses afforded by ordinary cap-plates. In forming the rigid cap-plates webs intersecting each other at right angles are provided with a top-plate which is bent vertically at two parallel edges, which vertical portions, together with the webs, constitute pockets for receiving the coiled springs. In this manner the coiled springs may be assembled very closely while at the same time constituting complete combinations of spring with retarding elements. The flexible cap-plates are preferably inclosed by the rigid cap-plates, so that the range of operation of the flexible cap-plates will be well defined and a structure more readily manufactured secured.

I will explain my invention more fully by reference to the accompanying drawings, in which—

Figure 1 is a bottom view on line 1 1 of Fig. 2. Fig. 2 is a vertical sectional view on line 2 2 of Fig. 1. Fig. 3 is a perspective view of a flexible cap-plate. Fig. 4 is a perspective view of a plurality of rigid cap-plates formed in one integral structure.

Like parts are indicated by similar characters of reference throughout the different figures.

The coiled springs $a$ are designed to be interposed between the parts to be cushioned, each coiled spring being surrounded by an individual cap-plate $b$, in this instance shown as the lower cap-plate, each individual cap-plate being formed of resilient spring metal, whereby the side flanges $c\ c$ thereof may in the embodiment of the invention shown tend to spread outwardly. There is also associated with each individual cap-plate $b$ a friction element, preferably rigid, which element preferably takes the form of a cap-plate, one for each coiled spring. The rigid cap-plates are preferably formed in an integral group, there being illustrated a plate portion $d$, designed for engagement with one of the parts to be cushioned. Each plate portion $d$ is downturned at its margins $e\ e$ to form some of the vertical walls of the cap-plates, the balance of these vertical walls being formed by webs $f\ f$, disposed at right angles with relation to each other and integrally formed with the plate $d$. The lower cap-plates, initially possessing some such shape as shown in Fig. 3, have their side flanges compressed to be inserted between the walls $e$ and $f$ of the rigid cap-plates, whereby these vertical walls of the flexible cap-plates are maintained under compression when inclosed by the rigid cap-plates, thereby constantly securing friction, this friction serving to retard the vibration of the coiled springs. This device is thus a satisfactory substitute for elliptic springs, which have hitherto been employed for interposition between the parts to be cushioned, wherein the component leaves furnish between themselves that degree of friction necessary to secure the results attained by my device and highly desirable, especially where passenger-cars or freight-cars for conveying perishable goods are concerned. By providing the flexible cap-plates with substantially rigid companion friction elements a much greater degree of friction, secured through the spring action of the flexible cap-plate, may be had than that secured between two cap-plates in engagement, both formed of spring metal, in that the rigid friction element or cap-plate offers what may be termed a "positive abutment," limiting and preventing material movement of the vertical flanges of the spring cap-plate, which limitation in the operation of the device is not present where both cap-plates are made of spring metal.

The device of my invention is particularly adapted for use in supporting railway-vehicles upon trucks, though the invention is not to be limited to this employment.

In Fig. 2 I have indicated parts $g$ and $h$, which are to be cushioned, there being interposed between these parts the coiled springs, the rigid cap-plates being indicated upon the upper part $g$, while the flexible cap-plates are indicated upon the lower part $h$.

Having thus described my invention, I claim as new and desire to secure by Letters Patent—

1. In a spring-cushion, the combination with a coiled spring interposed between the parts to be cushioned, of a friction element upon the exterior of the coiled spring formed of resilient spring metal and moving with one of the parts to be cushioned, and a rigid friction element moving with the other part to be cushioned, substantially as described.

2. In a spring-cushion, the combination with a coiled spring interposed between the parts to be cushioned, of a friction element upon the exterior of the coiled spring formed of resilient spring metal and moving with one of the parts to be cushioned, and a rigid friction element moving with the other part to be cushioned, the first aforesaid friction element being in the form of a cap-plate inclosing the coiled spring, substantially as described.

3. In a spring-cushion, the combination with a coiled spring interposed between the parts to be cushioned, of a friction element upon the exterior of the coiled spring formed of resilient spring metal and moving with one of the parts to be cushioned, and a rigid friction element moving with the other part to be cushioned, the second aforesaid friction element being in the form of a cap-plate inclosing the coiled spring, substantially as described.

4. In a spring-cushion, the combination with a coiled spring interposed between the parts to be cushioned, of a friction element upon the exterior of the coiled spring formed of resilient spring metal and moving with one of the parts to be cushioned, and a rigid friction element moving with the other part to be cushioned, the first friction element being in the form of a flexible cap-plate, while the second friction element is in the form of a rigid cap-plate, substantially as described.

5. In a spring-cushion, the combination with a coiled spring interposed between the parts to be cushioned, of a friction element upon the exterior of the coiled spring formed of resilient spring metal and moving with one of the parts to be cushioned, and a rigid friction element moving with the other part to be cushioned, the first friction element being in the form of a flexible cap-plate while the second friction element is in the form of a rigid cap-plate, the rigid cap-plate inclosing the flexible cap-plate, substantially as described.

6. The combination with a plurality of coiled springs interposed between the parts to be cushioned, of a plurality of flexible cap-plates moving with one of the parts to be cushioned, structurally distinct from each other and formed of spring metal to thereby secure friction, and a plurality of cap-plates formed in a single unitary structure with which the flexible cap-plates have frictional engagement and having side walls $e$, $e$ and webs $f$, $f$ affording pockets for receiving the coiled springs, substantially as described.

7. The combination with a plurality of coiled springs interposed between the parts to be cushioned, of a plurality of flexible cap-plates moving with one of the parts to be cushioned, structurally distinct from each other and formed of spring metal to thereby secure friction, and a plurality of rigid cap-plates formed in a single unitary structure with which the aforesaid cap-plates have frictional engagement and having side walls $e$, $e$ and webs $f$, $f$ affording pockets for receiving the coiled springs, substantially as described.

8. The combination with a plurality of coiled springs interposed between the parts to be cushioned, of a plurality of flexible cap-plates moving with one of the parts to be cushioned, structurally distinct from each other and formed of spring metal to thereby secure friction, and a plurality of cap-plates formed in a single unitary structure with which the flexible cap-plates have frictional engagement, and having side walls $e$, $e$ and webs $f$, $f$ affording pockets for receiving the coiled springs, the first aforesaid cap-plates being inclosed by the second aforesaid cap-plates, substantially as described.

9. The combination with a plurality of coiled springs interposed between the parts to be cushioned, of a plurality of flexible cap-plates moving with one of the parts to be cushioned, structurally distinct from each other and formed of spring metal to thereby secure friction, and a plurality of rigid cap-plates formed in a single unitary structure with which the aforesaid cap-plates have frictional engagement, and having side walls $e, e$ and webs $f, f$ affording pockets for receiving the coiled springs, the first aforesaid cap-plates being inclosed by the second aforesaid cap-plates, substantially as described.

In witness whereof I hereunto subscribe my name this 19th day of May, A. D. 1902.

EDWARD DENEGRE.

Witnesses:
HARVEY L. HANSON,
JOHN STAHR.